US007599701B2

(12) United States Patent
Duan

(10) Patent No.: US 7,599,701 B2
(45) Date of Patent: Oct. 6, 2009

(54) METHOD OF PROCESSING A PERIODIC LOCATION REQUEST

(75) Inventor: Xiaoqin Duan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 263 days.

(21) Appl. No.: 11/266,635

(22) Filed: Nov. 3, 2005

(65) Prior Publication Data

US 2006/0099961 A1    May 11, 2006

Related U.S. Application Data

(63) Continuation of application No. PCT/CN2004/001310, filed on Nov. 17, 2004.

(30) Foreign Application Priority Data

Nov. 20, 2003    (CN)    ................... 2003 1 0116755

(51) Int. Cl.
*H04Q 7/20*    (2006.01)
(52) U.S. Cl. .............. 455/456.2; 455/456.1; 455/456.3; 455/456.5; 455/404
(58) Field of Classification Search .............. 455/456.2, 455/456.1, 456.3, 414.1, 404.2, 456.5
See application file for complete search history.

(56) References Cited

U.S. PATENT DOCUMENTS

2004/0253964 A1* 12/2004 Zhu ........................ 455/456.3

FOREIGN PATENT DOCUMENTS

| EP | 1 337 123 | 8/2003 |
|---|---|---|
| WO | WO 03034765 | 4/2003 |
| WO | WO 03061322 | 7/2003 |

OTHER PUBLICATIONS

International Search Report for PCT/CN2004/001310, dated Jan. 20, 2005.
3GPP, "3$^{rd}$ Generation Partnership Project; Technical Specification Group Services and System Aspects; Functional Stage 2 Description of LCS (Release 6)," 3GPP TS 23.271 v6.5.0, pp. 1-108 (2003).
Huawei, China Mobile, "Enhanced LDR Reference Number in Rel 5," 3GPP TSG SA2 WG #35, pp. 1-10 (2003).
Huawei, China Mobile, "Enhanced LDR Reference Number in Rel 6," 3GPP TSG SA WG2 #36, S2-034353, pp. 1-18 (2003).
European Office Action for Application No. 04 789 904.2—2412, dated Jul. 31, 2007.
Supplementary European Search Report for Application No. 04 789 904.2-2412, dated Jan. 31, 2007.

* cited by examiner

*Primary Examiner*—David Q Nguyen
(74) *Attorney, Agent, or Firm*—Marshall, Gerstein & Borun LLP

(57) ABSTRACT

Disclosed is a method of processing a periodic location request when a location service system receives the periodic location request sent by a location service (LCS) client in relation to target user equipment and confirms the periodic location request as a periodic location request. The location service system allocates a reference number for the periodic location request based on a predefined rule. After locating the target user equipment, location service system returns a location result of the target user equipment, which carries the reference number, to the LCS client. According to the reference numbers allocated by the location service system, the LCS client can associate a location result of the target user equipment returned by the location service system with the periodic location request initiated by this LCS client, so as to guarantee processing normality of the periodic location request. In addition, with the reference number, the LCS client can explicitly identify which periodic location request should be cancelled when the LCS client initiates a cancellation procedure.

11 Claims, 4 Drawing Sheets

METHOD OF PROCESSING A PERIODIC LOCATION REQUEST

CROSS-REFERENCES TO RELATED APPLICATIONS

This is a continuation of International Application No. PCT/CN2004/001310, which was filed on Nov. 17, 2004, and which, in turn, claimed the benefit of Chinese Patent Application No. 200310116755.X, which was filed on Nov. 20, 2003, the entire disclosures of which are hereby incorporated herein by reference.

BACKGROUND OF THE DISCLOSURE

1. Field of the Technology

The present invention relates to network equipment location techniques and, more particularly, to a method of processing a periodic location request.

2. Background of the Invention

For Location Service (LCS) of mobile communication networks, location information of target User Equipment (UE) is obtained through positioning techniques, where UE denotes the UE terminal to be positioned in the mobile communication network, and location information may be either geographical latitude and longitude information or the location of local streets. Location information obtained by the mobile communication network may be provided to the target UE for self-positioning, or provided for the mobile network itself. Location information may alternatively be provided to other client application ends requesting the location of the target UE, such as organizations and individuals, for supplement service. Therefore, location service is of broad application in terms of emergency assistance, vehicle guidance, intelligence traffic system, work dispatching, team management, mobile yellow page inquiry and network performance enhancement, etc. LCS specifications as well as function mode, structure, state description and message flow of the whole LCS system are illustrated in The 3rd Generation Partnership Project (3GPP).

FIG. 1 is a schematic diagram illustrating logical structure of location service function. As shown in FIG. 1, as far as function logic is concerned, function logic entities for implementing location service include request end 101, LCS system 106 for implementing location service function entities and target UE 107. Function entities for implementing location service include Gateway Mobile Location Center (GMLC) 102, user data storage server 103, Central Network (CN) 104 and Radio Access Network (RAN) 105. Request end 101 may be composed of requester and LCS client end. LCS client end denotes a software or hardware entity, which is used for obtaining location information of one or more than one target UE 107 and accessed to GMLC 102; requester denotes an application client that requests for location information of target UE 107, such as an organization or individual, which initiates the location request, and LCS client end can also be a requester. GMLC 102 provides a standard LCS interface for information interaction between LCS client and function entities for implementing location service. In order to process location service messages, this process is as follows. Request end 101 is authenticated, and location request message sent by Request end 101 is authenticated. After the authentication, GMLC 102 sends the request for locating target UE 107 to CN 104, and lastly, GMLC 102 transmits the locating result of target UE 107 returned by CN 104 to Request end 101. User data storage server 103 is a Home Location Register (HLR) or Home Subscriber Server (HSS), used for storing user data and providing relevant information of target UE for other network logic entities, such as address information of the GMLC 102 to which target UE is affiliated, current GMLC 102 that target UE is located and address information of CN 104. CN 104 receives and processes the request for locating target UE 107 sent by GMLC 102, cooperates with RAN 105 to locate target UE 107, and returns the locating result of target UE 107 to GMLC 102.

GMLC may further include Requesting GMLC (R-GMLC), Home GMLC (H-GMLC) and Visited GMLC (V-GMLC). R-GMLC is a GMLC for receiving the location request initiated by LCS client to target UE, H-GMLC is a GMLC which the target UC belongs to, V-GMLC is the current GMLC that is working for target UE, and namely the GMLC that target UE is currently located. R-GMLC, H-GMLC and V-GMLC may be the same physical entity, or be different physical entities.

At present, in LCS 3GPP specification, location requests that LCS client sends to target UE are divided into two categories, namely immediate location request and deferred location request. As to immediate location requests, after LCS system receives the location request that LCS client sends to target UE, target UE is immediately located, and then location result of target UE is returned to LCS client. LCS system immediately returns location result of target UE to LCS client immediately upon receiving the location request sent by LCS client. As to deferred location request, LCS client demands LCS system to provide location information of target UE at a future time or when a certain event is detected. After receiving the location request that LCS client sends to target UE, LCS system needs to wait for a period, and returns the location result of target UE to LCS client after the deferred event is detected.

In addition, 3GPP allows LCS client to demand LCS to periodically provide location information of target UE. LCS client defines starting time and ending time as well as certain periodic logic, and demands LCS system to provide location information of target UE in this period of time according to the periodic logic. Besides, periodic location request and deferred location request may be combined. LCS client can send periodic deferred location request to LCS system.

FIG. 2 is a processing flowchart of periodic deferred location request in LCS specification of 3GPP. As shown in FIG. 2, the process of periodic deferred location request defined in LCS specification of 3GPP, which is associated by UE available deferred location request and periodic location request, includes the following steps.

Step 201: LCS client sends periodic deferred LCS Service Request to R-GMLC, and requests LCS system to provide location information of target UE, where the LCS Service Request carries target UE identifier and triggering events for locating target UE. For instance, as soon as being attached to mobile network, target UE will immediately be located. This LCS Service Request also carries certain periodic logic, namely start periodic timer, periodic ending time and time interval for locating target UE.

Step 202: after receiving the location information that LCS client sends to target UE, R-GMLC starts periodic timer at start periodic time according to periodic logic, and sends common deferred LCS Service Request to H-GMLC/V-GMLC, where the LCS Service Request carries the triggering event for locating target UE, as well as Reference Number allocated for common deferred LCS Service Request by R-GMLC, like 1234.

Steps 203-205: after receiving LCS Service Request, H-GMLC/V-GMLC sends Provide Subscriber Location request to CN, where the Provide Subscriber Location carries triggering event for locating target UE, as well as Reference Number allocated for common deferred LCS Service Request by R-GMLC, requesting CN to locate target UE when triggering event is detected. After receiving Provide Subscriber Location, CN judges whether triggering event condition is satisfied, target UE will be directly located if the condition is satisfied, otherwise, CN stores triggering event and Reference Number of target UE which is to be located, and then sends Provide Subscriber Location Acknowledgment (ACK) to H-GMLC/V-GMLC, notifying H-GMLC/V-GMLC that CN has accepted the common deferred location request sent by target UE. After receiving Provide Subscriber Location ACK, H-GMLC/V-GMLC sends LCS Service Response to R-GMLC, notifying R-GMLC that CN has accepted the common deferred location request sent by target UE; after receiving LCS Service Response, R-GMLC sends LCS Service Response to LCS client, where the LCS Service Response carries the Reference Number allocated for the current common deferred LCS Service Request by R-GMLC, notifying LCS client that LCS system has accepted the deferred location request sent to target UE by LCS client.

Step 206: when periodic timer of R-GMLC is timeout, and then R-GMLC judges whether it is in a state waiting for CN to return location result of target UE, and if yes, step 207a is executed. Otherwise, step 207b is executed.

The specific process of R-GMLC in state of waiting for CN to return location result is as follows.

Step 207a: R-GMLC sends LCS Service Response to LCS client, where the LCS Service Response carries the Reference Number allocated in step 202 by R-GMLC, so as to notify LCS client that location information of target UE is not to be provided.

Steps 208a and 209a: CN judges whether current occurrence condition of the stored triggering event is satisfied, and if yes, directly locating target UE, otherwise, continuing to wait for triggering event occurrence. When CN detects that triggering event has been detected, for instance, as for UE available deferred location request, LCS client requests to locate target UE as soon as target UE is accessed to mobile network. Here, when target UE requests access to mobile network, CN assumes that triggering event for locating this target UE has been detected, and CN cooperates with RAN to perform Location Procedure to target UE.

Steps 210a-212a: after finishing cooperating with RAN to locate target UE, CN sends Subscriber Location Report to H-GMLC/V-GMLC, where the Subscriber Location Report carries location result of target UE, as well as Reference Number stored by CN, like 1234. After receiving Subscriber Location Report, H-GMLC/V-GMLC sends Subscriber Location Report ACK to CN, notifying CN that location result of target UE has been received. Meanwhile, H-GMLC/V-GMLC sends LCS Service Response to R-GMLC, where the LCS Service Response carries the location result of target UE returned by CN, as well as Reference Number. After receiving LCS Service Response, R-GMLC may perform transform process to the received location result of target UE on need, say transforming latitude and longitude information into local physical information. R-GMLC sends LCS Service Response to LCS client, and provides the transformed final location information of target UE for LCS client, where the LCS Service Response carries the Reference Number. Then, R-GMLC turns to the state of not waiting for CN to return location result.

The specific process of R-GMLC not in state of waiting for CN to return location result is as follows.

Steps 207b-209b: R-GMLC resends common deferred LCS Service Request to H-GMLC/V-GMLC, where this LCS Service Request carries the triggering event for locating target UE, as well as the Reference Number of current common deferred LCS Service Request reallocated by R-GMLC, like 5678. Here, because this Reference Number is reallocated for current common deferred LCS Service Request by R-GMLC, this Reference Number is different from that allocated by R-GMLC in step 202. Subsequent steps are basically the same as steps 203-205, the difference being that Reference Number concerned in subsequent steps is different from that in steps 203-205.

Steps 210b-214b and steps 208a-212a are basically the same, the difference being that Reference Number concerned in steps 210b-214b is different from that in steps 208a-212a.

Procedure in each subsequent period is basically the same as that in the above-mentioned process.

The above-mentioned Reference Number is allocated and maintained by R-GMLC. In the procedure of processing periodic deferred location request, R-GMLC allocates a Reference Number for each to-be-processed single deferred location request respectively, and provides this Reference Number for CN through H-GMLC/V-GMLC. CN then stores this Reference Number. After finishing locating target UE, CN returns the location result of target UE to R-GMLC through H-GMLC/V-GMLC, carries the stored Reference Number, so that R-GMLC can associate this location result with the location request starting this locating procedure. In addition, when R-GMLC notifies LCS client that LCS system has accepted the location request that LCS client started, the Reference Number previously allocated for current under-process single deferred location request is provided for LCS client. Moreover, when returning location result of target UE to LCS client, R-GMLC carries the same Reference Number, so that LCS client can associate the received location information of target UE with the location request starting this locating procedure.

When LCS client cancels the previously started active location request, Reference Number is carried in cancellation request, so as to notify R-GMLC to cancel the location request corresponding to this Reference Number.

From the above description it can be seen that, according to the periodic logic provided by LCS client, LCS system divides the periodic deferred location request into several common deferred location requests. In the processing procedure, each divided location request is processed as a deferred location request, where Reference Number is allocated for the current under-process deferred location request, in order to identify this location request. In this way, LCS system will randomly allocate multiple Reference Numbers for those common deferred location requests, which are included in periodic deferred location request started by LCS client, such that Reference Numbers of the common deferred location request are different. Therefore, as to the same periodic deferred location request, LCS client will receive multiple responses with different Reference Numbers. Accordingly, LCS client cannot associate the self-starting periodic deferred location request with the response which is subsequently allocated Reference Number by LCS system, nor with location result of target UE. For instance, in the processing flowchart of FIG. 2, R-GMLC allocates a Reference Number 1234 for the first common deferred location request, and notifies LCS client in step 205 that Reference Number of periodic deferred location request previously started is 1234. Therefore, LCS client holds that only the location information response with Reference Number 1234 returned by LCS system is response of this periodic deferred location request. However, R-GMLC allocates a Reference Number 5678 for the second common deferred location request, and in step

209b, R-GMLC sends LCS Service Response with Reference Number 5678 to LCS client, in order to notify LCS client that the periodic location request has been accepted. Consequently, LCS client is unable to determine which previous location request this response is associated with, leading to uncertainty of the received location result of target UE. Moreover, in the above situation, when LCS client sends cancel message with Reference Number 1234 to LCS system, wishing to cancel the previously sent periodic deferred location request, as Reference Number of this request is 5678 in LCS system hereby, LCS system cannot find out the current active location request with Reference Number 1234, and is consequently unable to cancel this deferred location request correctly.

SUMMARY OF THE INVENTION

In accordance with one aspect of the disclosure, a method is provided for processing a periodic location request, so as to guarantee processing normality of the periodic location request. The method is useful for processing periodic location request when a location service system receives the location request initiated by LCS client in terms of target UE and confirms that this location request is a periodic location request. The method includes the location service system allocating a reference number for the periodic location request based on a predefined rule. After locating target UE, location service system returns location result of target UE, which carries the reference number, to LCS client.

In some cases, the allocating step includes allocating the same reference number for every to-be-processed location request included in the periodic location request. Alternatively, the allocating step includes allocating different reference numbers for the current under-process location request and the next to-be-processed location request after the current one.

The method may further include the location service system processing the current location request, setting a periodic timer, and allocating a reference number for current location request. When the periodic timer is timeout, the method may include judging whether the processing of the current location request has finished. If processing of the current location request has not finished, the location service system may then continue processing the current location request. If processing of the current location request has finished, the location service system may return location result of target result, which carries the reference number allocated for current location request, to LCS client, so the to-be-processed location request becomes current location request. The location service system may then process the current location request, set periodic timer, and directly take the reference number allocated for the last location request as the reference number for the current location request.

Alternatively, the method further includes the location service system processing the current location request, setting periodic timer, and allocating a reference number for current location request. When the periodic timer is timeout, the method may include judging whether the processing of the current location request has finished. If the processing of the current location request has not finished, the location service system may then continue processing the current location request. If the processing of the current location request has finished the location service system may return location result of target result, which carries the reference number allocated for current location request, to LCS client, so that the to-be-processed location request becoming current location request. The location service system may then process the current location request, set periodic timer, and reallocate a reference number for the current location request.

In some cases, the method may include, before the returning step, the location service system transmitting the reference number to LCS client, where the reference number thereof is corresponding to current under-process location request.

The periodic location request may be a periodic deferred location request or periodic immediate location request.

In some cases, the method further includes LCS client transmitting cancellation request for a periodic location request, which carries the reference number, to location service system, and location service system canceling the periodic location request corresponding to the reference number.

In accordance with another aspect of the disclosure, LCS system allocates a Reference Number for the location request initiated by LCS client according to a certain rule, and returns this Reference Number to LCS client. According to this Reference Number allocated by LCS system, LCS client can associate location result of target UE returned by LCS system with the periodic location request initiated by LCS client, so as to guarantee processing normality of periodic location request. In addition, when LCS client is to cancel the periodic location request initiated by this LCS client, this Reference Number can be carried in the cancellation request which is sent to LCS system, the periodic location request to be cancelled is explicitly identified, then LCS system cancels the periodic location request corresponding to the Reference Number.

DETAILED DESCRIPTION OF PREFERRED EMBODIMENTS

In accordance with one aspect of the disclosure, LCS system allocates a Reference Number according to certain rule for periodic location request initiated by LCS client, so that LCS client can associate location result of target UE returned by LCS system with the periodic location request initiated by LCS client according to the Reference Number allocated by LCS system, so as to guarantee processing normality of periodic location request.

When LCS system receives the location request initiated by LCS client in terms of target UE, according to periodic logic information carried in this location request, such as start periodic timer, periodic ending time and time interval for locating target UE, LCS system confirms this location request is periodic logic information request, then LCS system starts the timer according to periodic time interval, and allocates Reference Number for this periodic logic information request. There are various methods for LCS system to allocate Reference Number for periodic logic information request, and methods for LCS system to allocate Reference Number will be described in detail with reference to a specific embodiment.

Figure 1:
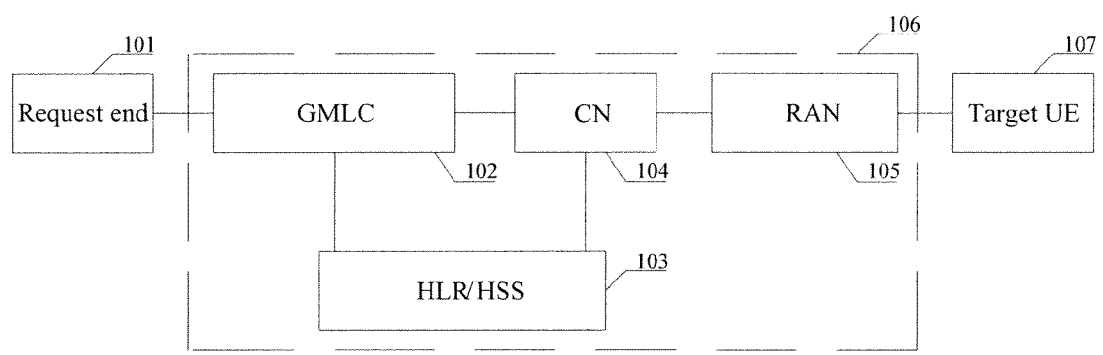
FIG. 1 a schematic diagram illustrating location service function logic.
Figure 2:
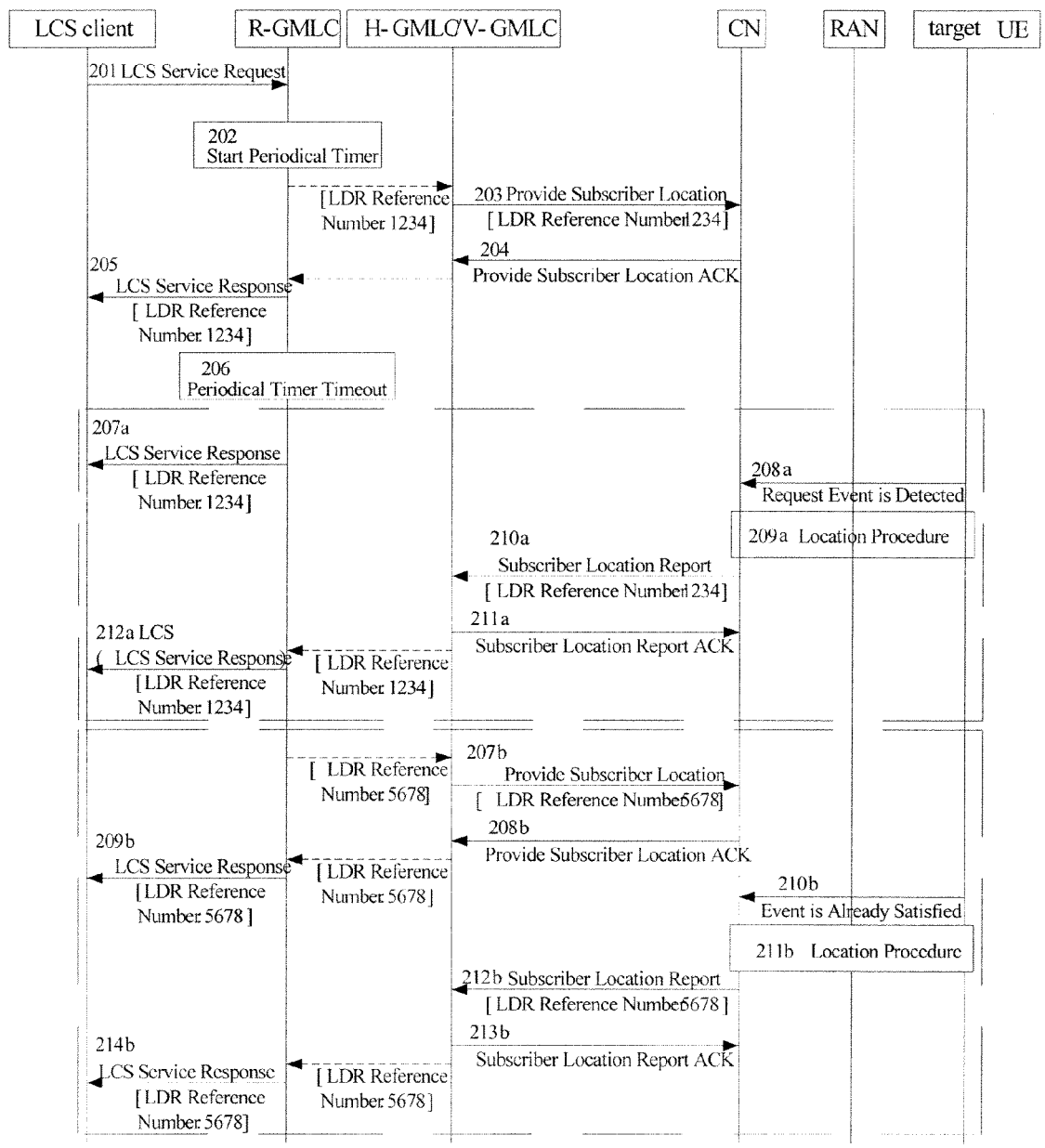
FIG. 2 is a flowchart illustrating the processing of a periodic location request in accordance with the LCS specification of 3GPP.
Figure 3:
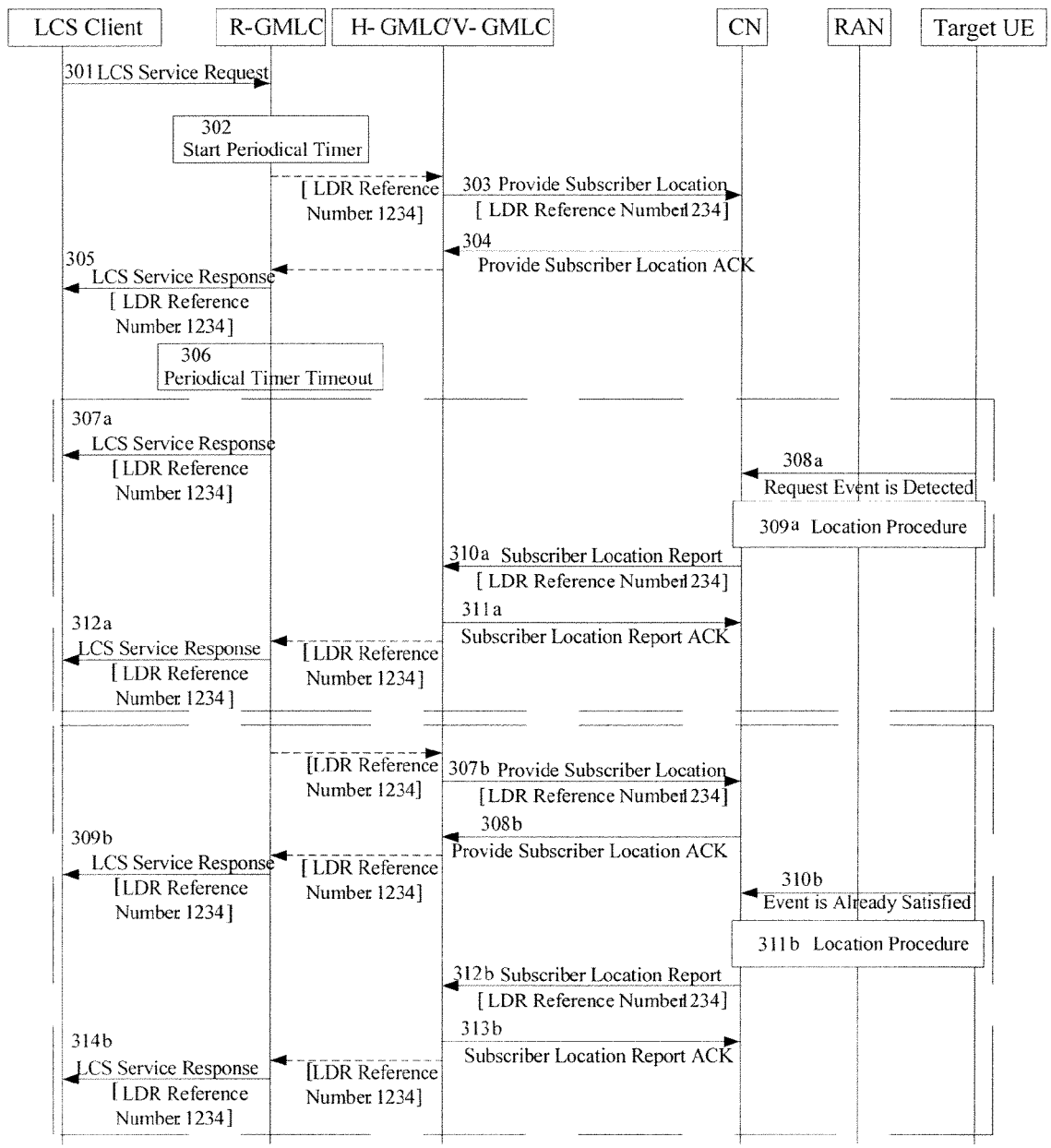
FIG. 3 is a flowchart illustrating the processing of a periodic deferred location request in accordance with one embodiment of the disclosed method.

FIG. 3 is a flowchart illustrating how to process periodic deferred location request in the present invention. As shown in FIG. 3, processing procedure of UE available deferred location request is as follows.

Step 301 is the same as step 201.

Step 302: after receiving the location request initiated by LCS client in terms of target UE, according to periodic logic information carried in this location request, R-GMLC confirms this location request is periodic deferred location request, then starts periodic timer at start periodic time according to periodic logic, and sends common deferred LCS Service Request to H-GMLC/V-GMLC, where this LCS Service Request carries a triggering event for locating target UE as well as Reference Number allocated for this periodic deferred location request by R-GMLC, like 1234.

Steps 303-305 are the same as steps 203-205.

Step 306: when periodic timer of R-GMLC is timeout, R-GMLC judges whether R-GMLC is in state of waiting for CN to return location result of target UE, and if yes, step 307*a* is executed; otherwise, step 307*b* is executed.

Specific steps of R-GMLC in state of waiting for CN to return location result are as follows.

Step 307*a* is the same as step 207*a*.

Steps 308*a*-312*a* are the same as steps 208*a*-212*a*.

Specific steps of R-GMLC not in state of waiting for CN to return location result are as follows.

Steps 307*b*-309*b*: R-GMLC retransmits common deferred LCS Service Request to H-GMLC/V-GMLC, where this LCS Service Request carries triggering event to locating target UE, as well as Reference Number allocated by R-GMLC for periodic deferred location request, which this LCS service request belongs to, for example, the allocated 1234 in step 302. Subsequent steps are the same as steps 303-305.

Steps 310*b*-314*a* and steps 208*a*-212*a* are basically the same, and Reference Number concerned in steps 210*b*-214*b* is the same as that in step 302.

Processing procedures in each subsequent periodic are almost the same and reference numbers used in the procedure are all the reference numbers allocated in step 302.

During a periodic time interval for locating, if no triggering event of subscriber location is detected, this target UE cannot be located before the triggering event of subscriber location is detected, only after target UE is located and location result of target UE is returned to LCS client, can the next location request be processed in the closest periodic time. For example, LCS client demands LCS system to locate target UE once 30 minutes, location information triggering event is that target UE enters area A, effective time slice is 10:00 to 14:00; during the time slice 11:00 to 11:30, if target UE is not in area A, LCS system will not process the next location request of this periodic deferred location request, and still process current location request; when target UE enters area A at 11:40, LCS system will locate target UE, and returns location result of target UE to LCS client, here LCS system finishes processing current location request, then LCS system will locate the next location request of this periodic deferred location request at 12:00. Here, processing cycle of periodic deferred location request is not strictly defined to be time, while only after one location request in this periodic deferred location request is finished processing, namely target UE is located, can the next location request in this periodic deferred location request be processed.

If current location request is still under-process, LCS system will continue to process current location request; if current location request is finished processing, LCS system will return location result of target UE, which carries the reference number of current location request, to LCS client, so the to-be-processed location request becomes current location request, LCS system will process the current location request, set a periodic timer, the reference number allocated for the previous location request can be directly taken as that of the current location request, or a new reference number can be allocated for the current location request.

Figure 4:
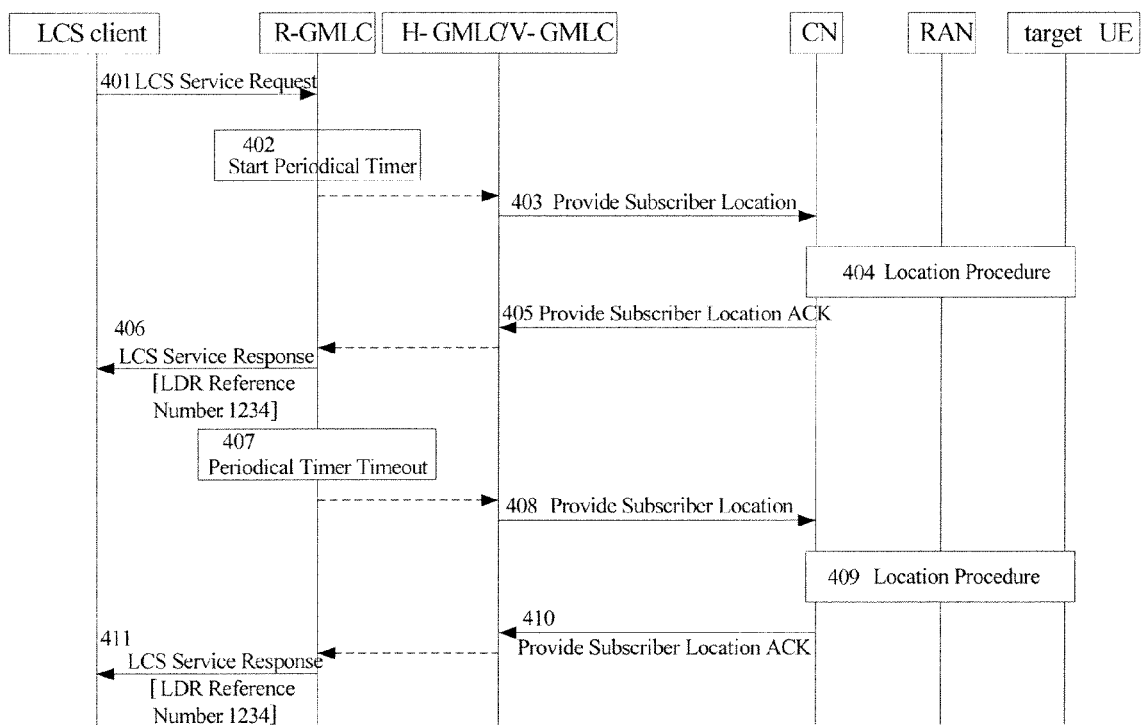
FIG. 4 is a flowchart illustrating the processing of a periodic immediate location request in accordance with one embodiment of the disclosed method.

FIG. 4 is a flowchart illustrating how to process periodic immediate location request in the present invention. As shown in FIG. 4, the process of periodic immediate location request, which is associated by immediate location request and periodic location request, includes the following steps.

Step 401: LCS client sends periodic immediate LCS Service Request to R-GMLC, so as to request LCS system to provide location information of target UE, where this LCS Service Request carries target UE identifier and certain periodic logic, namely start periodic timer, end periodic timer and time interval for locating target UE.

Step 402: after receiving the location request initiated by LCS client in terms of target UE, according to the periodic logic information carried in location request, R-GMLC confirms this location request is periodic immediate location request, then starts periodic timer at start periodic time according to periodic logic, allocates reference numbers for current under-process LCS Service Request and to-be-processed one, like 1234 and 5678, and sends common immediate LCS Service Request to H-GMLC/V-GMLC.

Steps 403-406: after receiving LCS Service Request, H-GMLC/V-GMLC sends Provide Subscriber Location to CN, so as to request CN to locate target UE immediately. After receiving Provide Subscriber Location, CN cooperates with RAN to perform location procedure on target UE. After finishing cooperating with RAN to locate target UE, CN sends Provide Subscriber Location ACK to H-GMLC/V-GMLC, and returns location result of target UE. After receiving Provide Subscriber Location ACK, H-GMLC/V-GMLC transmits the LCS Service Response to H-GMLC, and returns location result of target UE. After receiving Provide Subscriber Location ACK, H-GMLC can transform the returned location result of target UE on need, like transforming latitude and longitude information into local physical information; R-GMLC sends LCS Service Response to LCS client, provides the transformed final location information of target UE for LCS client, where the LCS Service Response carries the reference number allocated by R-GMLC in step 402, like 1234, as well as the reference number allocated for the to-be-processed LCS service request by R-GMLC, like 5678.

Steps 407-411: when periodic timer of R-GMLC is timeout, the next period becomes current period, after current LCS service request is finished processing, R-GMLC allocates a reference number for the next to-be-processed LCS service request, say 0986, then retrainsmits common immediate LCS service request to H-GMLC/V-GMLC. Subsequent procedure is almost the same as steps 403-406, where the only difference lies in: when location result of target UE is returned to LCS client at last, the carried reference number of current under-process location request is different from that of next to-be-processed location request say 5678 and 0986.

LCS system can allocate general reference numbers for periodic location request, then allocate a reference number for each location request of this periodic location request, so that LCS client can determine the periodic location request that is corresponding to the received location result of target UE.

There are various kinds of methods for LCS system to allocate a reference number for a location request, if only LCS client can associate the received location result of target UE with the location request initiated by this LCS client, therefore, methods for allocating reference numbers will not be illustrated in detail.

When LCS client needs to cancel the location request initiated by this LCS client, a reference number may be included in cancellation request which is sent to LCS system, so that to-be-canceled periodic location request can be explicitly identified, and then LCS system cancels the periodic location request which is corresponding to this reference number.

The above description sets forth one or more preferred embodiments with the understanding that it is not used to confine the protective scope of the following claims to the described embodiments.

The invention claimed is:

1. A method of processing a location request received and confirmed by a location service system to be a periodic location request, the periodic location request having been initiated by a location service (LCS) client in relation to target user equipment (UE), the method comprising:
   (A) the location service system allocating a reference number that identifies the periodic location request based on a predefined rule;
   (B) after locating the target UE, the location service system returning a location result of the target UE to the LCS client, the location result carrying the reference number;
   the LCS client transmitting a cancellation request for the periodic location request to the location service system; and
   the location service system canceling the periodic location request corresponding to the reference number.

2. The method according to claim 1, wherein (A) comprises allocating the reference number for every to-be-processed location request included in the periodic location request.

3. The method according to claim 2, further comprising:
   the location service system processing a current location request, setting a periodic timer and allocating a further reference number for the current location request;
   when the periodic timer is timed out, judging whether the location service system processing the current location request has finished;
   if the location service system processing the current location request has not finished, the location service system continuing processing the current location request; and
   if the location service system processing the current location request has finished, the location service system returning the location result of the target UE to the LCS client such that a further location request is then processed by the location service system by setting a further periodic timer and by reallocating the further reference number for the further location request.

4. The method according to claim 2, further comprising:
   the LCS client transmitting a cancellation request for the periodic location request to the location service system; and
   the location service system canceling the periodic location request corresponding to said reference number.

5. The method according to claim 1, wherein step (A) comprises allocating different reference numbers for a first location request currently being processed and a second location request to be processed after the first location request.

6. The method according to claim 5, wherein upon allocating the different reference numbers for the current under-process location request and the next-to-be processed location request after the current one, the method further comprising:
   the location service system processing a current location request, setting a periodic timer and allocating a further reference number for the current location request;
   when the periodic timer is timed out, judging whether the location service system processing the current location request has finished;
   if the location service system processing the current location request has not finished, the location service system continuing processing the current location request;
   if the location service system processing the current location request has finished, the location service system returning the location result of the target UE to the LCS client such that a further location request is then processed by the location service system by setting a further periodic timer and by reallocating the further reference number for the further location request.

7. The method according to claim 5, further comprising before (B), the location service system transmitting the different reference numbers to the LCS client, wherein the reference numbers correspond with the first location request.

8. The method according to claim 5, further comprising:
   the LCS client transmitting a cancellation request for the periodic location request to the location service system; and
   the location service system canceling the periodic location request corresponding to said reference number.

9. The method according to claim 1, wherein the periodic location request is a periodic deferred location request or a periodic immediate location request.

10. The method according to claim 1, further comprising before (B), the location service system transmitting the reference number to the LCS client, wherein the reference number corresponds with the location request.

11. The method of claim 1, wherein the periodical location request is a LCS service request, the method further comprising:
    receiving the LCS service request initiated by the LCS client against the target UE for a Location Service;
    allocating a unique reference number to the LCS service request;
    periodically sending a Provide Subscriber Location message with the unique reference number to a Central Network (CN);
    returning a first LCS service response to the LCS client to notify the LCS client that the location service system has accepted the LCS service request, the first LCS service response carrying the unique reference number; and
    for each Provide Subscriber Location message, receiving a Subscriber Location Report with the unique reference number from the CN, and returning a second LCS service response to the LCS client according to the Subscriber Location Report, the second LCS service response carrying the unique reference number.

* * * * *